FACSIMILE SYNC PULSE GENERATION SYSTEM

Filed Oct. 31, 1961 4 Sheets-Sheet 1

INVENTORS
JOHN W. SMITH
DAVID SHALER
HUGH C. RESSLER
BY Edward V. Connors
ATTORNEY INVENTORS
JOHN W. SMITH
DAVID SHALER
HUGH C. RESSLER
BY Edward V. Connors
ATTORNEY INVENTORS:
JOHN W. SMITH
DAVID SHALER
HUGH C. RESSLER
BY Edward T. Connors
ATTORNEY

FACSIMILE SYNC PULSE GENERATION SYSTEM

Filed Oct. 31, 1961 4 Sheets-Sheet 4

INVENTORS:
JOHN W. SMITH
DAVID SHALER
BY HUGH C. RESSLER
Edward V. Conna
ATTORNEY United States Patent Office 3,173,993

Patented Mar. 16, 1965

3,173,993

FACSIMILE SYNC PULSE GENERATION SYSTEM

John W. Smith, Whitestone, N.Y., David Shaler, Waldwick, N.J., and Hugh C. Ressler, Bayside, N.Y., assignors to Hogan Faximile Corporation, New York, N.Y.

Filed Oct. 31, 1961, Ser. No. 149,038
12 Claims. (Cl. 178—69.5)

The present invention relates to high speed facsimile equipment and more particularly to a sync pulse generation system for the facsimile equipment.

High speed facsimile equipment has been developed which will scan and transmit a standard microfilm, and make a graphic copy of the microfilm on an eight and one half inch by eleven inch page with a resolution of one hundred lines per inch at the rate of one page per second. Alternatively the graphic record may be eighteen inches wide in which event copy is made at the rate of four inches per second. Such equipment is thus able to record a million dots per second.

In such a high speed facsimile system the transmitter includes a mechanical optical scanner which transmits line-by-line information as a succession of video electric signals with a sync pulse therebetween indicating the start of the scan line. In the recorder a plurality of styli are arranged in a line, the video electric signal being sequentially distributed to the various styli by means of an electronic distributor controlled by the sync pulse.

A suitable scanner has been found to include a radial disc with light slits thereon in juxtaposition to a linear slit on which the image to be transmitted is focussed. In order to appreciate the difficulties in the production of a suitable scanner, it is necessary to consider the dimensions of the parts thereof and the high degree of accuracy necessary to produce a practical working device. The rotatable disc is about seventeen and one half inches in diameter and has an opaque surface with fourteen light transmitting radial slits spaced equally distant around the outer edge of the disc and terminating about one half inch from the edge of the disc. The radial slits are .0012 inch in width and ⅜" (inch) in length. The width of the slit is approximately one third of the diameter of a human hair. The linear light transmitting slit is about three and one half inches in length and is .0018 inch in width. The spacing between the disc and the linear slit is about .010 inch. The microfilm image is about one and one quarter inches in width and is enlarged as it is projected for focussing on the linear slit to 3.510 inches or a 2.81 to 1 magnification. The recorded graphic copy may be of any desired size but copy eighteen inches in width with a one hundred line per inch resolution is satisfactory. In this case the overall enlargement is about fourteen to one, or a five to one enlargement from the image on the linear slit. In order to have a practical working copy, the horizontal jitter or variation in a straight line extending vertically must not exceed .005 inch as the element width is .01 inch. It is thus obvious that extremely close tolerances must be kept in the working parts of the facsimile scanner.

In fabricating the disc it has been found prohibitively expensive to provide a glass disc of the required diameter which would be within the required .003 inch tolerance in the plane of the disc. Further, it is extremely difficult to provide an even opaque coating on such a disc, as the total accumulative variation must be kept within the .003 variation before mentioned.

A satisfactory disc has been made of aluminum with openings approximately one eighth inch wide by one half inch in length to receive glass plates coated with an opaque material and having a clear light transparent slit of the .0012 width by three eighths inch in length. In positioning the plates in position an angular error in positioning may be compensated by the use of a sync pulse for each slit. Heretofore it has been considered impossible to compensate for a non radial position of one slit with respect to another, and it has been necessary to remove the slit and reinstall it.

Another difficulty is presented in the manufacture of the disc in that the sync pulse must be presented not more than 40 microseconds before the start of the video electric signal for the first element as the inherent accuracy of the delay circuit is one percent. The disc rotates at eighteen hundred revolutions per minute or thirty revolutions per second and carries fourteen slits. Thus 420 slits per second pass the linear slit which is about three and one half inches in length. (The time between slits to pass an elemental area is thus 2400 microseconds.) At this speed a 40 microsecond delay with one percent accuracy corresponds to four tenths of a microsecond error or about four tenths of an element; therefore the distance from the first element imaged on the linear split must not exceed .06 inch. In order to operate available electric circuitry it is necessary that the sync pulse be easily separable from the video signals at the receiver. For example, the pulse may be "blacker than black," that is, the sync pulse is greater in amplitude than the magnitude of the video electric signal from a black element. This is accomplished by using a separate light source and a separate photoelectric cell to receive the variation in the light producing the sync pulse. The sync pulse may then be amplified to the desired magnitude and electrically placed in sequential relationship with the video electrical signal. Thus a further difficulty is introduced in that the light producing the sync pulse must be received by a separate photocell from that receiving the light producing the video electrical signal and the available mechanical spacing to accommodate the separation is only .06 inch.

Because of the small .06 inch spacing available for the separation of the light beams, heretofore constructions have been provided in which the light for the sync pulse photocell has been passed at an angle other than at the same angle as the angle of the video light through the linear and radial slits to the photocell. This has caused horizontal jitter because of the non-planar rotation of the disc in that the variation in the spacing between the disc slit and the fixed linear slit has the effect of producing a variation in the timing of the sync pulse with respect to the start of the video line.

The present invention aims to overcome the difficulties and disadvantages of prior constructions by providing a method of and a construction for producing a sync pulse, close in time relationship to the beginning of the video scan, which has an extremely rapid rise time, which may be shifted with respect to the beginning of the video scan, and shifted radially to reduce the effect of angular variations in the radial slits, and which was produced from a sync light source and passed through means directing it through the scanning slits at substantially the same angle as the angle of the light at start of the video scan.

Another object of the invention is to provide a pulse generation system which is simple and economical in manufacture, precise in operation, and rugged in use.

Other objects and advantages of the invention will be apparent from the following description and from the accompanying drawings which show, by way of examples, embodiments of the invention.

URE 1 and illustrating the means of separating the light for the sync photocell from the light for the video scan photocell.

Figure 2:
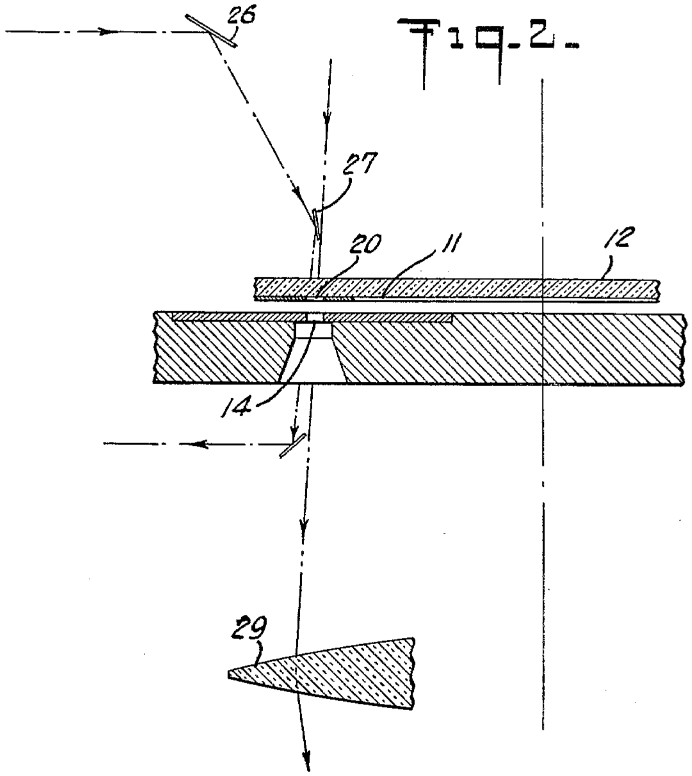
FIGURE 2 is an enlarged view of a portion of FIG-
Figure 3:
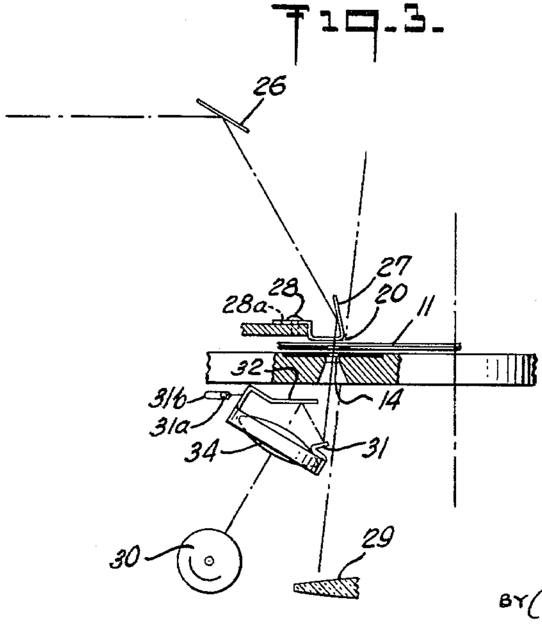

FIGURE 3 is a view corresponding to FIGURE 2 and illustrating a specific construction incorporated in a commercial embodiment of the invention.

Figure 4:
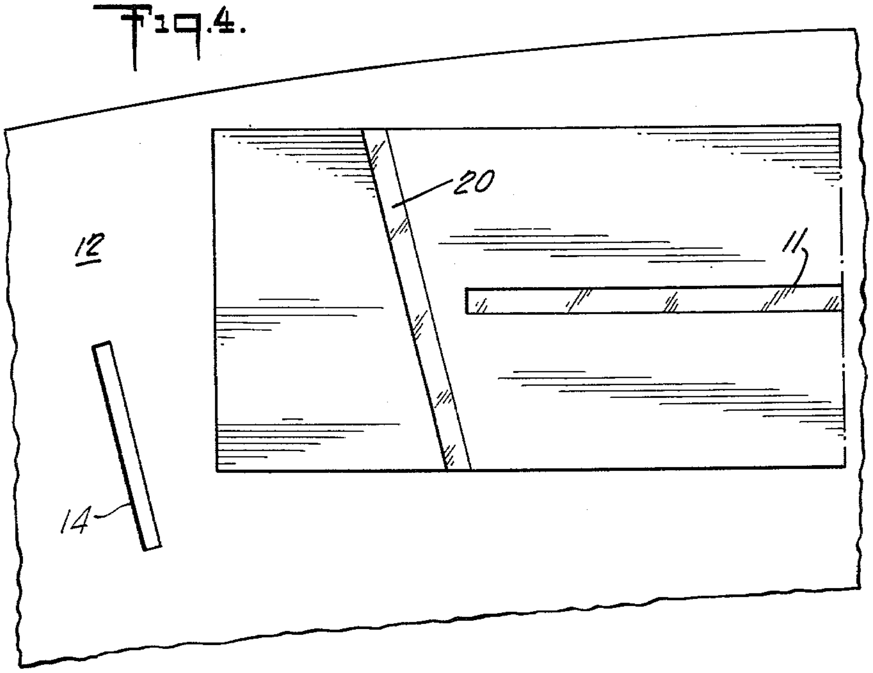

FIGURE 4 is an enlarged top view of a portion of the disc carrying the radial slits and a portion of the linear scanning slit with the sync light timing slit in accordance with the invention.

Figure 5:
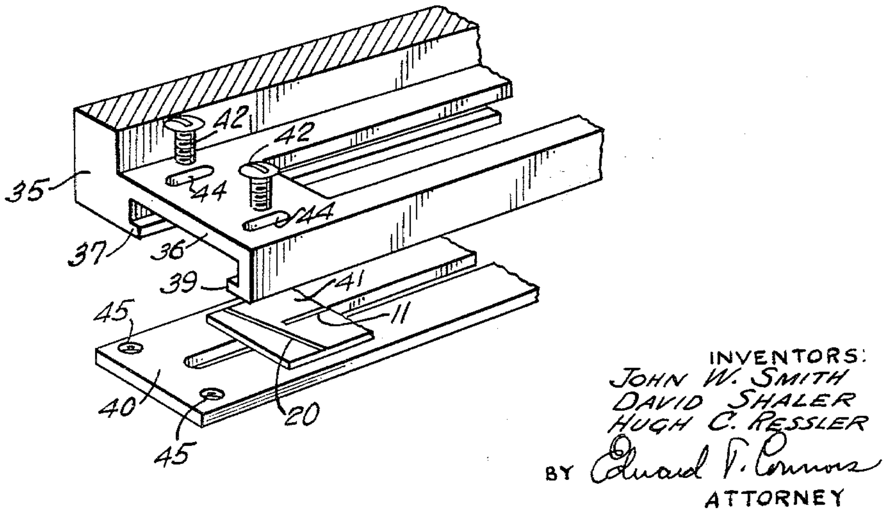

FIGURE 5 is a perspective view of a portion of a commercial construction of a linear scanning slit and a sync light timing slit in accordance with the invention.

Figure 1:
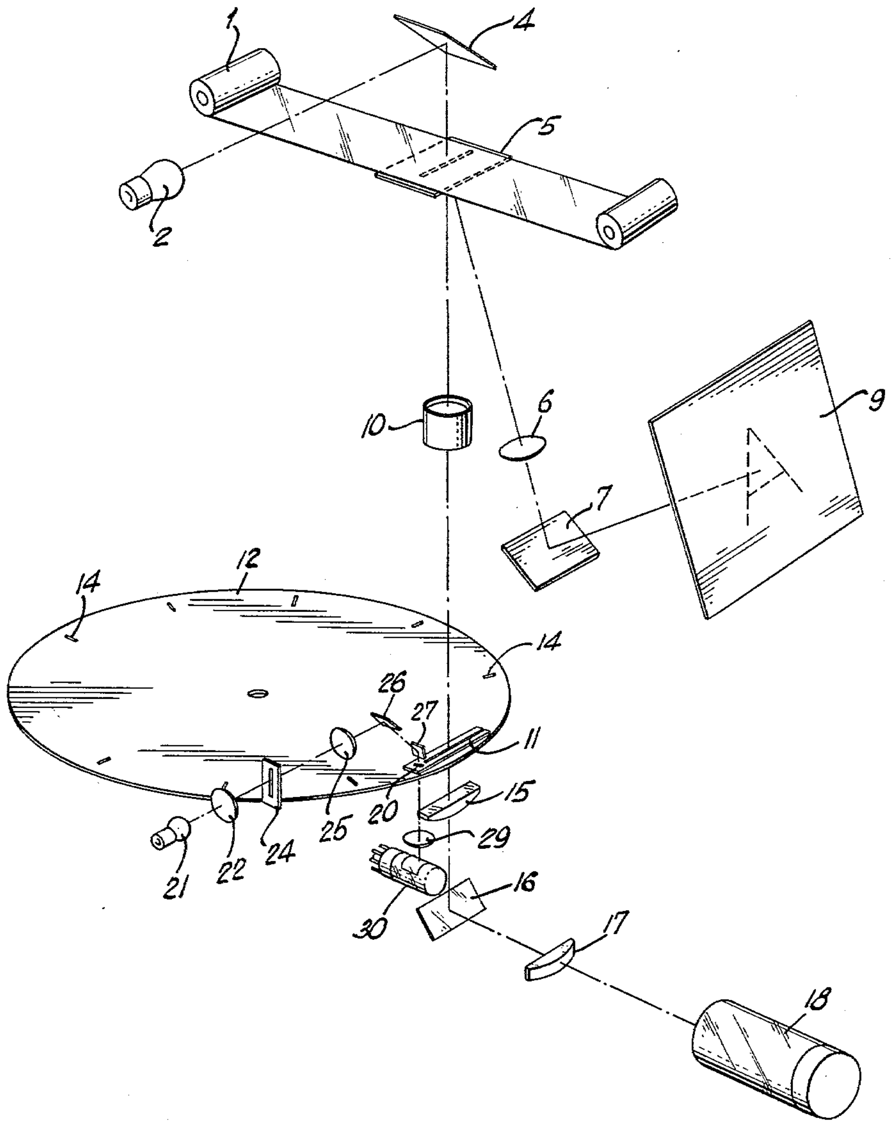
FIGURE 1 is an exploded schematic drawing of a facsimile scanner incorporating pulse generation means in accordance with the invention.
Figure 6:
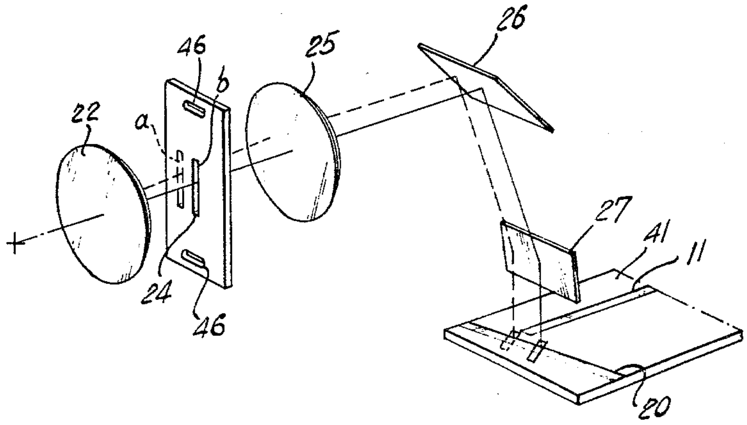

FIGURE 6 is an enlarged view of a portion of FIGURE 1 and illustrating means for shifting the sync light timing radially with respect to the radial slits to reduce the effect of angular variations therein.

Figure 7:
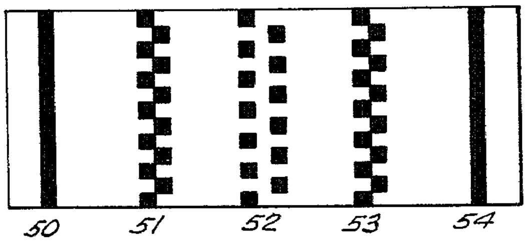

FIGURE 7 illustrates at an enlarged scale the horizontal jitter resulting in vertical lines of copy with a non-radial slit on the disc.

Figure 8:
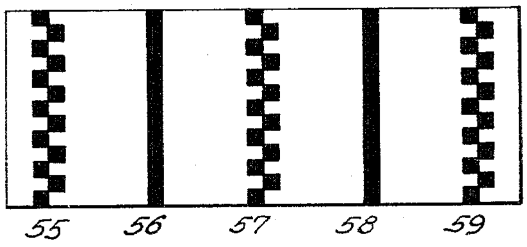

FIGURE 8 is an illustration according to FIGURE 6 in which the jitter has been reduced by a construction in accordance with the invention.

In the schematic drawing of FIGURE 1 there is shown a facsimile transmitter incorporating pulse generation means in accordance with the invention and which is adapted to scan a roll of microfilm 1. The facsimile transmitter includes a light source 2 which projects light to be reflected by a mirror 4 to a scanning window 5. The illuminated image from the window 5 may be visually observed through a lens 6 reflected by a mirror 7 to a ground glass observation window 9. The image at the scanning window 5 is also viewed by a lens 10 focussed on a linear scanning slit 11 in juxtaposition to a disc 12. The light from an elemental area of the image is passed through the linear scanning slit 11, then through one of the radial scanning slits 14 of the disc 12 and through an optical system including a lens 15, a mirror 16, and another lens 17, to a photocell 18. The support for the linear scanning slit 11 also includes a sync pulse timing slit 20 which is adapted to receive light from a sync pulse light source 21. The sync light is passed through a separate optical system including a lens 22, a sync light beam shaping slit 24 which is adjustably movable horizontally, through another lens 25, and thence reflected by mirrors 26 and 27 through the sync pulse timing slit 20, through one of the radial scanning slits 14 and a lens 29, to a sync pulse light photocell 30. In the detailed showing of FIGURE 2 the passage of the sync pulse light and video scan light is clearly shown.

In FIGURE 3 there is shown a construction of a commercial embodiment in accordance with the invention which permits a workable assembly of the parts of the scanner, which, as explained heretofore, is extremely difficult because of the close quarters involved, and because of the precise construction necessary to provide a workable video electric signal. In FIGURE 3 the light reflected through the linear scanning slit 11 and the sync pulse timing slit 14 is picked up by a mirror 31 rotatable on its supporting means **31*a* and slideable in its slot 31*b*. The light is then reflected to another mirror 32, and thence passed through a lens 34 to the sync light photocell 30. The mirror 27 may be adjustably moved towards and away from the video light beam by adjustment means 28 slideable in its slot 28*a*. This construction provides a means of transferring the sync pulse timing light to the photocell without interference with the light producing the video electric signal even though the separation between the light beams at the linear slit 11** does not exceed .06 inch.

In FIGURE 4 there is an enlarged view showing the relative positions of the sync light timing slit 20 and linear slit 11.

In FIGURE 5 the structure of a commercial embodiment incorporating the invention is shown with the parts illustrated as separated. The structure is adapted to be positioned over the disc 12 and includes a supporting member 35 having an extension 36 which cooperates with flanges 37 and 39 to provide a guideway for a flat linear slit support member 40. Attached to the upper surface of the member 40 is a glass plate 41 having an opaque coating thereon scribed to provide the linear slit 11 and the sync pulse slit 20. The effective position of the sync slit 20 may be varied with respect to the effective start of the linear slit 11 by moving the member 40 laterally since the start of the linear slit 11 is fixed by a non-moving mask. The member 40 is secured in position by screws 42 extending through adjustment slots 44 to engage threaded holes 45 of the member 40.

In FIGURE 6 there is shown an enlarged view of a portion of FIGURE 1. In addition the sync light beam shaping slit 24 is shown with horizontally extending slots 46 adapted to receive screw means (not shown) so that the position of the slit 24 may be adjusted as desired. In FIGURE 6 the letters *a* and *b* indicate two positions of the sync light beam and as projected on the sync light timing slit 20.

As previously explained, in the practical manufacture of the disc 12 it is more economical to fabricate the body of the disc of aluminum or other light metal and insert glass strips coated and scribed to provide the radial slits 14. In the event the slits are unequally spaced radially adequate compensation is had inasmuch as a sync pulse is provided for each radial slit. However, if the pieces of glass with the slits 14 are inadvertently positioned so that the slits are not all at the same angle which is preferably but not necessarily zero with respect to disc radii horizontal jitter appears in vertical lines of the recorded copy. In FIGURE 7 there is shown at an enlarged scale five vertical lines 50, 51, 52, and 53, each vertical line consisting of elemental dots one hundredth of an inch in size. The line 50 is at the left hand edge of the copy, line 51 one quarter to the right, line 52 in the middle of the copy, line 53 three quarters across the copy, and line 54 near the right hand edge of the copy. It should be noted that line 50 is without jitter, line 51 has a one element jitter, line 52 a two element jitter, line 53 a one element jitter, and line 54 is without jitter. It may be assumed, for example, that this recording was made with the sync light beam shaping slit 24 in the position (*a*) of FIGURE 6 since the same point on each radial slit which generates the sync pulse also starts the scanned line and also ends the scanned line if the linear slit is properly positioned. By adjusting the position of the sync light beam shaping slit 24 to the position (*b*), for example, and depending upon the non-radiality of the slits 14 it is possible to achieve an effective reduction in the horizontal jitter as shown in FIGURE 8. Position (*b*) is so located that it is intersected by the point on each radial slit which will one-quarter and three-quarters of a line later scan copy lines 51 and 53.

The vertical lines 55, 56, 57, 58 and 59 correspond to the vertical lines 50, 51, 52, 53 and 54 of FIGURE 7. However, it should be noted that lines 55 and 59 have a one element jitter while lines 50 and 54 have no jitter. Lines 56 and 58 have no jitter while lines 51 and 53 have a one element jitter; but most importantly, line 57 has only a one element jitter while line 52 has a two element jitter. The effect of the two element jitter in line 52 is that a double line is seen rather than a single line. In the case of the one element jitters of lines 51, 53, 55, 57 and 59 the observer merely notes a slightly widened line. Further, by reason of the distribution of the slightly widened lines, the copy is more pleasing to the eye and has improved readability.

It has thus been seen that in accordance with the invention a construction is provided for placing a sync light beam in close proximity to a video light beam wherein the available working space is less than six one hundredths of an inch and still permits the crossing of the intersection between the radial and linear slits at the same angle as the video light so as to overcome any difficulty which might be presented because of the non planar rotation of the disc. Further, a construction has been provided in which the sync pulse may be generated with an extremely rapid rise time in that the positioning of the sync light timing slit in the same plane as the linear slit assures the presentation of a sharp edge for the light beam resulting in an extremely rapid rise time. In addition this construction provides means for precisely determining the incident of a sync pulse with respect to the beginning of a video scan by the use of the adjustable means for the support of the sync light timing slit and the linear slit. Still further, the adjustments of the radius at which the sync light beam intersects the sync light timing slit provides a means to insure good facsimile copy with a distributed effect of a variation in non-radiability of the radial slits.

While the invention has been described and illustrated with reference to a specific embodiment thereof, it will be understood that other embodiments may be resorted to without departing from the invention. Therefore, the form of the invention set out above should be considered as illustrative and not as limiting the following claims.

We claim:

1. A facsimile sync pulse generation system comprising a rotatable disc, means forming radial scanning slits on the disc, means forming a sync light slit and a linear scanning slit cooperating with the radial scanning slits, a source of scanning light passing through said cooperating slits at a predetermined angle, a source of sync light, and means directing the sync light through the sync light slit at the same angle as the angle of the scanning light passing through the scanning slits.

2. A facsimile sync pulse generation system comprising a rotatable disc, radial scanning slits carried by the disc, means forming a linear scanning slit to cooperate with the radial scanning slits, means forming a sync light timing slit operatively positioned in the plane of the linear slit spaced therefrom and extending in a direction radially of the disc, means for producing a narrow beam of sync light and directed across the sync light timing slit, a light source, means cooperating with the light source for producing an image of copy on the linear slit and means for directing the narrow beam of sync light through the radial and sync timing slits at approximately the same angle as the angle of the light forming the adjacent edge of the image on the linear slit.

3. A facsimile sync pulse generation system comprising a rotatable disc, radial scanning slits carried by the disc, means forming a linear scanning slit to cooperate with the radial scanning slits, means forming a sync light timing slit operatively positioned in the plane of the linear slit spaced therefrom and extending in a direction radially of the disc, means for adjustably positioning the sync light slit axially of the linear scanning slit, means for producing a narrow beam of sync light and directed across the sync light timing slit, a light source, means cooperating with the light source for producing an image of copy on the linear slit, and means for directing the narrow beam of sync light through the radial and sync timing slits at approximately the same angle as the angle of the light forming the adjacent edge of the image on the linear slit.

4. A facsimile sync pulse generation system comprising a rotatable disc, radial scanning slits carried by the disc, means forming a linear scanning slit to cooperate with the radial scanning slits, means forming a sync light timing slit operatively positioned in the plane of the linear slit spaced therefrom and extending in a direction radially of the disc, means for producing a narrow beam of sync light and directed across the sync light timing slit, means for adjustably positioning the narrow beam of sync light along the length of the sync light timing slit, a light source, means cooperating with the light source for producing an image of copy on the linear slit, and means for directing the narrow beam of sync light through the radial and sync timing slits at approximately the same angle as the angle of the light forming the adjacent edge of the image on the linear slit.

5. A facsimile sync pulse generation system comprising a rotatable disc, radial scanning slits carried by the disc, means forming a linear scanning slit to cooperate with the radial scanning slits, means forming a sync light timing slit operatively positioned in the plane of the linear slit spaced therefrom and extending in a direction radially of the disc, means for producing a narrow beam of sync light and directed across the sync light timing slit, a light source, means cooperating with the light source for producing an image of copy on the linear slit, means for directing the narrow beam of sync light through the radial and sync timing slits at approximately the same angle as the angle of the light forming the adjacent edge of the image on the linear slit, and means for adjustably positioning the narrow beam of sync light with respect to the light forming the adjacent edge of the image.

6. A facsimile sync pulse generation system comprising a rotatable disc, radial scanning slits carried by the disc, means forming a linear scanning slit to cooperate with the radial scanning slits, means forming a sync light timing slit operatively positioned in the plane of the linear slit spaced therefrom and extending in a direction radially of the disc, means for adjustably positioning the sync light slit axially of the linear scanning slit, means for producing a narrow beam of sync light and directed across the sync light timing slit, means for adjustably positioning the narrow beam of sync light along the length of the sync light timing slit, a light source, means cooperating with the light source for producing an image of copy on the linear slit, means for directing the narrow beam of sync light through the radial and sync timing slits at approximately the same angle as the angle of the light forming the adjacent edge of the image on the linear slit, and means for adjustably positioning the narrow beam of sync light with respect to the light forming the adjacent edge of the image.

7. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, a source of scanning light directed towards the cooperating radial and linear slits, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

8. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, the sync light slit positioned in approximately the same plane as the linear slit, a source of scanning light directed towards the cooperating radial and linear slits, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

9. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, the sync light slit extending radially of the rotatable disc and the linear slit extending chordwise of the rotatable disc, a source of scanning light directed towards the cooperating radial and linear slits, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

10. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, means for moving the radial slit axially with respect to the linear slit, a source of scanning light directed towards the cooperating radial and linear slits, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

11. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, means for producing a narrow beam of the sync light extending across the sync light slit, a source of scanning light directed towards the cooperating radial and linear slits, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

12. A facsimile sync pulse generation system comprising a rotatable disc, means forming a plurality of radial scanning slits on the disc, means forming a sync light slit, means forming a linear scanning slit, the sync light slit and the linear scanning slit cooperating with the radial scanning slits, means for producing a narrow beam of the sync light extending across the sync light slit, means for adjustably positioning the narrow beam of light along the sync light slit, a source of scanning light directed towards the cooperating radial and linear slit, a source of sync light directed towards the cooperating radial and sync light slits, and means for rotating the disc in the direction so that each radial scanning slit first approaches the sync light slit and then approaches the linear scanning slit whereby each radial scanning slit produces a sync pulse before each line which it scans.

References Cited by the Examiner

UNITED STATES PATENTS 2,173,501 9/39 Schlesinger ------- 178—69.5 XR

DAVID G. REDINBAUGH, *Primary Examiner.*